June 24, 1941.    L. CACCIOPPOLI    2,247,185
DISTILLATION PROCESS
Filed March 31, 1939    2 Sheets-Sheet 1

Inventor
L. Caccioppoli

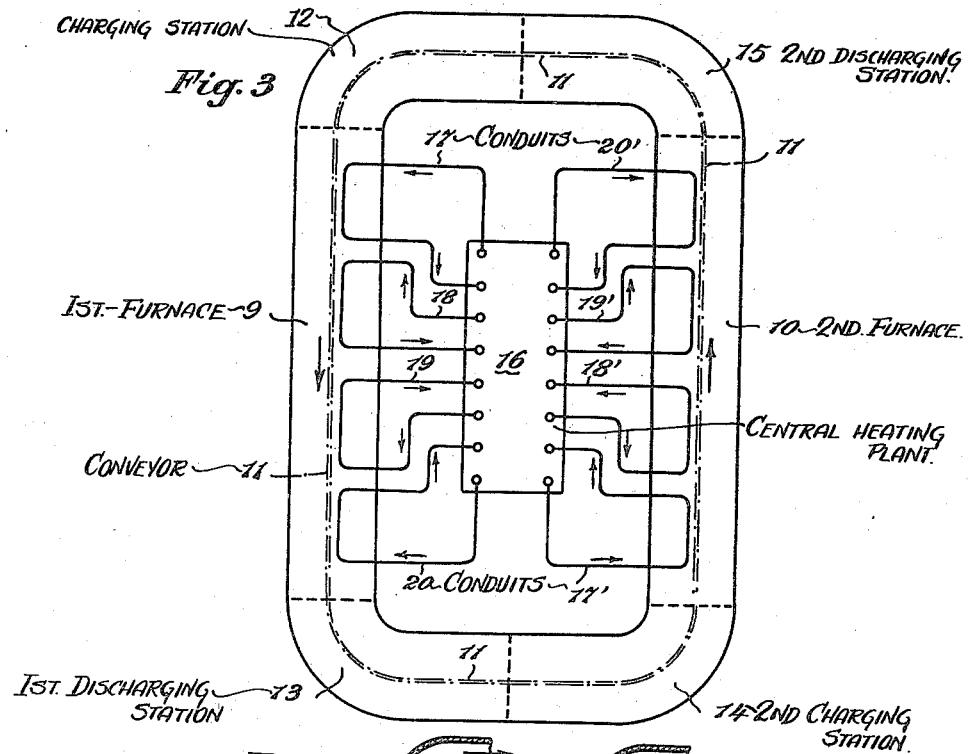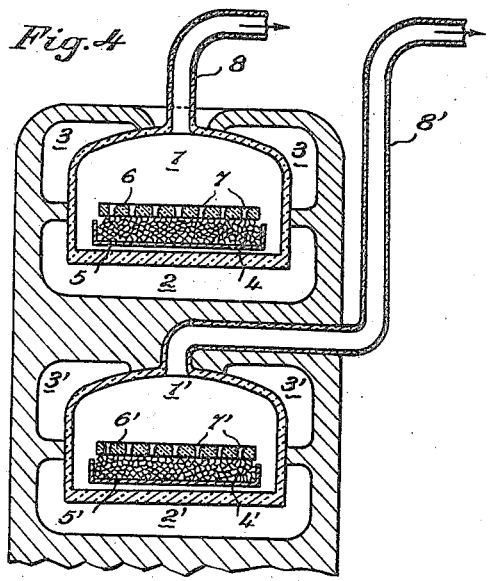

Patented June 24, 1941

2,247,185

UNITED STATES PATENT OFFICE 2,247,185

DISTILLATION PROCESS

Lorenzo Caccioppoli, Rome, Italy

Application March 31, 1939, Serial No. 265,295
In Italy April 6, 1938

2 Claims. (Cl. 202—12)

My invention relates to a continuous oven process for distillating or carbonating fuels, bituminous slate and the like.

It is well known that in distillation or carbonisation processes the temperature, the speed and the duration of the heating have a great importance as to the influence that such elements may have on the solid, liquid and gaseous derivatives.

More particularly, when materials are distillated in order to obtain therefrom gaseous or liquid products, for instance tar, which products are liable to be altered by heating, for instance, by cracking, it is necessary to subtract the distillation products as quickly as possible from the space wherein they are generated, by making use, if necessary, of a cooling.

According to my invention a continuous oven or furnace is provided, which fulfills satisfactorily such requirements. In the process according to the invention the stock under treatment passes with a continuous motion through variable temperature zones, the walls of the furnace being preferably separately heated in order to have, in a predetermined transverse section of the oven for instance the ceiling at a temperature very less than the temperature of the bottom. Furthermore, means for extraction of distillation products are provided at intervals along the track of the material to be treated.

In such a way it is possible to regulate the intensity and the duration of a heating and moreover the distillation products may be separately removed from the furnace in the very moment they are generated, and may also be cooled if necessary in order to prevent their alteration.

According to an embodiment of my apparatus, the furnace comprises an elongated main distillation chamber, the walls of which are surrounded by secondary upper and lower chambers within which hot or cold air or gases may be introduced as the material to be treated passes through the main chamber. In the upper part of the main chamber apertures are provided so that the products which are developed in the oven zone immediately underlying such apertures may be extracted.

According to a further embodiment of my apparatus, the structure recited above may be duplicated in the height, in order to reduce the horizontal encumbrance of the oven plant.

According to a further feature of my invention the furnace may be heated by sections, for instance, a central heating plant may be provided which conveys hot gases in parallel to the single sections of the oven, suitable controlling means being employed to regulate the quantity and/or the temperature of the hot gases introduced in the oven. The heating gases after having passed through the corresponding sections of the oven may be recirculated through the central heating plant and then reintroduced in another section of the oven. For instance, the heating gases enter the oven at a temperature of 550° C. and leave the same at 500° C. Such gases are reheated in the central heating plant to 550° C. and reintroduced into the working cycle.

According to a further feature of my apparatus the furnace is horizontally duplicated, that is, two furnaces which may be either of a single or of a multiple vertical type are connected horizontally in series, so that the conveying means which traverse one furnace after having passed through a discharging station and through a charging station, enter the second furnace and on leaving this second furnace they pass through a second discharging station and a second charging station thereupon reentering the first furnace.

Other features of my invention will be understood from the following particular description.

The invention is illustrated in the accompanying drawings, in which

Fig. 3 is a diagrammatic representation of a twin furnace according to my invention;

Fig. 4 is a transverse section similar to Fig. 2 but showing the duplication in the height of the furnace.

Figure 2:
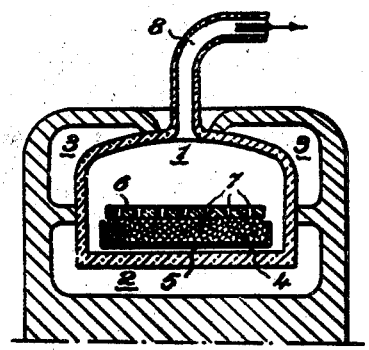
Fig. 2 is a transverse vertical section on the line II—II of Fig. 1.

Referring more particularly to the drawings, my oven comprises an elongated main distillation chamber the temperature of which is controlled from the outside by introducing a hot or cold fluid, which may be generated by a suitable heater, for instance, by a central heating plant. Such gases are conveyed through the lower secondary chambers 2 and the upper secondary chambers 3, which surround almost completely the distillation chamber 1, as it is better shown in Fig. 2.

The distribution of the controlling gases in the various chambers 2 and 3 affords a temperature diagram plotted on the length of the oven which corresponds to the desired distillation process. It is possible also to have a non-uniform distribution of the heat at a predetermined transverse section of the oven, introducing, for instance, cold gases in the upper chambers 3 and hot gases in the lower chambers 2.

The stock to be treated 4 is disposed in a layer the height of which is conveniently determined and placed on trucks or containers 5 of a conveyor. Such conveyors may be of a standard type and require therefore no particular description. The containers 5 may be covered by covers 6 with apertures, preferably in the form of holes 7 to permit of the expulsion of the distillation gases.

The weight of the covers varies according to the results which are to be obtained, for instance, according to the compactness of the solid distillation product.

The gaseous and liquid products of the thermic treatment are removed through the conduits 8 as indicated by the arrows.

When the "minute" swelling fuel such as slack coal for example is to be treated in order to produce coke, compact semi-coke, primary tar etc., the process is conducted as follows:

(1) The fuel is charged on the upper platform of the conveyor containers 5, which are suitably designed in order to permit the gases to pass underneath of the containers for warming up the same.

(2) The height of the fuel layer varies according to the quality of the fuel to be treated; generally speaking is of some decimetres.

(3) In order to prevent that the fuel, swelling up during heating process, may give a little compact product, the fuel layer is covered by a cover 6, which is wholly or partially formed by a refractory material, having a predetermined weight which is calculated in order to obtain the desired compactness degree. This cover 6 has a sufficient number of apertures through which pass the gases expelled out of the fuel by action of the heat.

(4) As soon as the fuel enters the furnace, it finds such a temperature that there may be initiated the preheating and drying process. The steam is immediately extracted from the furnace by suitable suction means through the upper conduits 8.

(5) The fuel is conveyed through the furnace by means of the containers 5 and reaches zones of a higher temperature; the temperature variation is obtained by suitably controlling the admission of hot gases in the chambers 2 and 3 so that said variation will correspond to a diagram predetermined in each single case.

As the temperature increases, are expelled the gases which correspond to determined expulsion temperature for instance sulphurated hydrogen etc. which are always eliminated through the conduits 8 which are immediately above the zone wherein said gases are generated. At a temperature of about 300–350° C. the primary tar begins to distillate. Since it is necessary that the primary tar does not suffer alterations for example cracking in the presence of high temperatures, the upper part of the inner wall of the oven is refrigerated by means of cold air or gases circulating through the upper chambers 3.

(6) As soon as the distillation has reached the desired point, either for the quality or the quantity of the gaseous or liquid products to be extracted, or for the quality of the solid product to be obtained, the heating is stopped or reduced also in the lower chambers 2, by introducing in said chambers 2 cold gases or air, in order to obtain the cooling of the semi-coke or the coke, recovering at the same time the heat which is afterwards utilized in heating the anterior part of the oven itself.

(7) The discharge of the containers from the furnace is effected in such a way as to prevent the air from entering the inner part of the oven; the same precautions will be used at the entrance.

Figure 1:
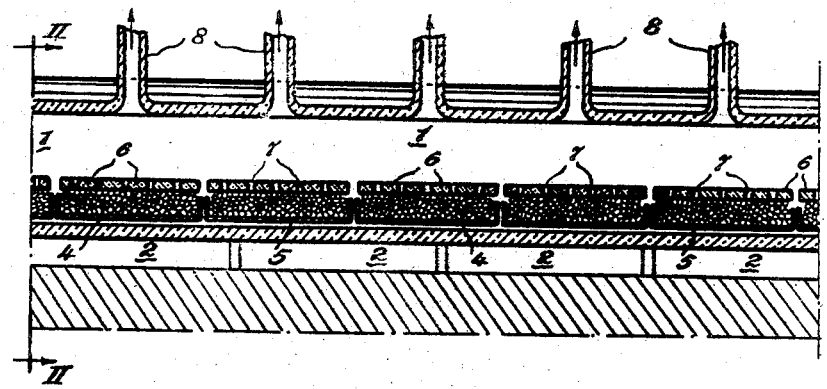
Fig. 1 is a partial longitudinal vertical section through an oven according to my invention.

Referring now to Fig. 3, two furnaces 9 and 10 are disposed horizontally in series and only one conveyor 11 is provided for both the furnaces. The processing stock, conveyed by the conveyor 11, is charged in the containers 5 (Fig. 1) in the charging station 12, passes through the first furnace 9, and then is discharged in the discharging station 13, whilst the fuel containers 5, which are yet warm or hot, are charged again with fresh fuel in the charging station 14. From this station the conveyor enters in the second furnace 10, passes through discharging station 15 and reaches again the charging station 12 and so on.

By these means a saving of heat is obtained, because the conveyor never reaches the outer temperature, but is only moderately cooled in the discharging and charging stations, and reaches the furnace in conserving a rather elevated temperature. Moreover, a saving of manual work and power is obtained.

Referring furthermore to Fig. 3, a central heating plant 16 generates the heating gases, which are conveyed to the single sections of the furnaces 9 and 10 by means of the parallelly mounted conduits 17, 18, 19, 20 and 17', 18', 19' and 20'. Suitable registers and control valves are provided in order to regulate the quantity and the temperature of the heating gases transversing said heating conduits. By these means a low temperature may be maintained in the whole of the distillating chamber 1, and this low temperature may be exactly distributed as required on the length of the chamber 1.

According to Fig. 4 the furnace comprises two superposed distillation chambers 1 and 1', which are surrounded by temperature controlling chambers 2, 3 and 3'. The distillation gaseous products are extracted by means of the conduits 8 and 8'. By these means a saving of plant area is obtained.

The features of Figs. 3 and 4 are preferably combined together in order to get a very efficient distillation oven.

Having now particularly described and ascertained the nature of my said invention and in what manner the same is to be performed, I declare that what I claim is:

1. A continuous distillation process for carbonization of solid fuels, bituminous slates and the like, which comprises passing the stock to be treated through and along the lower portion of an elongated closed horizontal distillating chamber, subjecting the lower portion of the chamber to a heating action exteriorly thereof to drive off the volatiles, removing the volatiles at various points and directly from the top of said distillating chamber, and subjecting the upper portion of the distillating chamber to a positive cooling action exteriorly thereof to prevent alteration of the volatiles and vary the temperature at various points along the length of the distillating chamber.

2. A continuous distillation process as claimed in claim 1, in which the heating action is varied by the introduction of cold gases.

LORENZO CACCIOPPOLI.